United States Patent
Biadglin et al.

(10) Patent No.: US 11,281,121 B2
(45) Date of Patent: Mar. 22, 2022

(54) ELECTROPHOTOGRAPHIC INK COMPOSITION INCLUDING COPOLYMER OF OLEFIN AND (METH) ACRYLIC ACID AND CHARGE ADJUVANT

(71) Applicant: HP Indigo B.V., Amstelveen (NL)

(72) Inventors: Getahun Biadglin, Ness Ziona (IL); Yaron Grinwald, Ness Ziona (IL); Emad Masoud, Ness Ziona (IL); Reut Avigdor, Ness Ziona (IL); Gil Bar-Haim, Ness Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 16/497,150

(22) PCT Filed: Oct. 12, 2017

(86) PCT No.: PCT/EP2017/076095
§ 371 (c)(1),
(2) Date: Sep. 24, 2019

(87) PCT Pub. No.: WO2019/072393
PCT Pub. Date: Apr. 18, 2019

(65) Prior Publication Data
US 2021/0124283 A1    Apr. 29, 2021

(51) Int. Cl.
| | | |
|---|---|---|
| G03G 9/13 | (2006.01) | |
| C09D 11/03 | (2014.01) | |
| C09D 11/107 | (2014.01) | |
| C09D 11/52 | (2014.01) | |
| G03G 9/135 | (2006.01) | |
| G03G 15/10 | (2006.01) | |
| H01M 4/04 | (2006.01) | |
| H01M 4/1391 | (2010.01) | |
| H01M 10/0525 | (2010.01) | |
| H01M 10/0565 | (2010.01) | |
| H01M 10/058 | (2010.01) | |

(52) U.S. Cl.
CPC .......... *G03G 9/131* (2013.01); *C09D 11/03* (2013.01); *C09D 11/107* (2013.01); *C09D 11/52* (2013.01); *G03G 9/135* (2013.01); *G03G 15/10* (2013.01); *H01M 4/0402* (2013.01); *H01M 4/1391* (2013.01); *H01M 10/058* (2013.01); *H01M 10/0525* (2013.01); *H01M 10/0565* (2013.01); *H01M 2300/0082* (2013.01)

(58) Field of Classification Search
CPC ........ G03G 9/131; G03G 9/135; C09D 11/03; C09D 11/107; C09D 11/52; H01M 4/0402; H01M 4/1391; H01M 10/0525; H01M 10/0565; H01M 10/058
USPC ......................................... 429/217; 29/623.5
See application file for complete search history.

(56) References Cited

U.S. PATENT DOCUMENTS

| | | | |
|---|---|---|---|
| 6,467,156 B1 * | 10/2002 | Velasquez ......... | H01M 10/0436 29/730 |
| 7,368,191 B2 | 5/2008 | Andelman et al. | |
| 7,638,252 B2 | 12/2009 | Stasiak et al. | |
| 8,053,035 B2 | 11/2011 | Lambrech et al. | |
| 2006/0121342 A1 | 6/2006 | Sano et al. | |
| 2008/0118826 A1 * | 5/2008 | Shimamura ........... | H01M 6/48 429/129 |
| 2008/0220330 A1 * | 9/2008 | Hosaka ............... | H01M 4/139 429/209 |
| 2010/0009258 A1 * | 1/2010 | Hasegawa ............ | H01M 4/131 429/217 |
| 2010/0099026 A1 * | 4/2010 | Choi ................... | H01M 4/0414 429/212 |
| 2010/0104947 A1 * | 4/2010 | Choi ................... | H01M 10/056 429/304 |
| 2013/0157105 A1 | 6/2013 | Picard et al. | |
| 2014/0011084 A1 | 1/2014 | Fujdala et al. | |
| 2014/0011086 A1 * | 1/2014 | Fujdala ................ | C01B 25/45 429/211 |
| 2018/0166749 A1 * | 6/2018 | Ono ..................... | H01G 11/20 |
| 2019/0140249 A1 * | 5/2019 | Fukui ................. | H01M 10/0562 |

FOREIGN PATENT DOCUMENTS

| | | | |
|---|---|---|---|
| CN | 1985400 | 6/2007 | |
| CN | 104641496 | 5/2015 | |
| WO | WO-2016194995 A1 * | 12/2016 | ........... C01B 25/372 |
| WO | 2017148539 | 9/2017 | |

OTHER PUBLICATIONS

Wang, Flexographically Printed Rechargeable Zinc-based Battery for Grid Energy Storage, Electronic Theses and Dissertations, UC Berkeley, 2013, 106 pages.
International Search Report dated Feb. 2, 2018 for PCT/EP2017/076095, Applicant HP Indigo B.V.

* cited by examiner

*Primary Examiner* — Sean P Cullen
(74) *Attorney, Agent, or Firm* — Thorpe North & Western LLP

(57) ABSTRACT

In one aspect, the present disclosure relates to a liquid electrophotographic electrode ink composition comprising: a thermoplastic polymer comprising a copolymer of an olefin and acrylic acid and/or methacrylic acid; an electroactive material comprising a lithium intercalation material; a charge adjuvant, and a liquid carrier.

18 Claims, No Drawings

ELECTROPHOTOGRAPHIC INK COMPOSITION INCLUDING COPOLYMER OF OLEFIN AND (METH) ACRYLIC ACID AND CHARGE ADJUVANT

BACKGROUND

A lithium ion cell comprises an anode, a cathode and an electrolyte. The anode and cathode may each comprise a lithium ion intercalation material. Thus, both the cathode and the anode allow lithium ions to move in and out of their structures in a process by intercalation or de-intercalation. During discharge, the (positive) lithium ions move from the negative electrode to the positive electrode through the electrolyte, while electrons flow through an external circuit. When the cell charges, the reverse occurs with lithium ions and electrons moving back to the negative electrode.

Lithium ion cells may be used as a power source for a variety of applications.

DETAILED DESCRIPTION

Before the present disclosure is disclosed and described, it is to be understood that this disclosure is not limited to the particular process steps and materials disclosed in this disclosure because such process steps and materials may vary. It is also to be understood that the terminology used in this disclosure is used for the purpose of describing particular examples. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

As used in this disclosure, "carrier fluid", "carrier liquid," "carrier," or "carrier vehicle" refers to the fluid in which polymers, particles, charge directors and other additives can be dispersed to form a liquid electrostatic composition or liquid electrophotographic composition. The carrier liquids may include a mixture of a variety of different agents, such as surfactants, co-solvents, viscosity modifiers, and/or other possible ingredients.

As used in this disclosure, "electrophotographic composition" or "electrostatic composition" generally refers to a composition, which is suitable for use in an electrophotographic or electrostatic printing process. The electrophotographic composition may comprise chargeable particles of polymer dispersed in a carrier liquid.

As used herein, "electrophotographic ink composition", which may be termed an "electrostatic ink composition", generally refers to an ink composition, which may be in liquid form. The composition is suitable for use in an electrophotographic or electrostatic printing process. The electrophotographic ink composition may include chargeable particles of polymer dispersed in a carrier liquid. The composition may include a colorant that is visible to the eye.

As used in this disclosure, "co-polymer" refers to a polymer that is polymerized from at least two monomers. The term "terpolymer" refers to a polymer that is polymerized from 3 monomers.

As used in this disclosure, "melt index" and "melt flow rate" are used interchangeably. The "melt index" or "melt flow rate" refers to the extrusion rate of a resin through an orifice of defined dimensions at a specified temperature and load, reported as temperature/load, e.g. 190° C./2.16 kg. In the present disclosure, "melt flow rate" or "melt index" is measured per ASTM D1238-04c Standard Test Method for Melt Flow Rates of Thermoplastics by Extrusion Plastometer. If a melt flow rate of a particular polymer is specified, unless otherwise stated, it is the melt flow rate for that polymer alone, in the absence of any of the other components of the electrostatic composition.

As used in this disclosure, "acidity," "acid number," or "acid value" refers to the mass of potassium hydroxide (KOH) in milligrams that neutralizes one gram of a substance. The acidity of a polymer can be measured according to standard techniques, for example as described in ASTM D1386. If the acidity of a particular polymer is specified, unless otherwise stated, it is the acidity for that polymer alone, in the absence of any of the other components of the liquid toner composition.

As used in this disclosure, "melt viscosity" generally refers to the ratio of shear stress to shear rate at a given shear stress or shear rate. Testing may be performed using a capillary rheometer. A plastic charge is heated in the rheometer barrel and is forced through a die with a plunger. The plunger is pushed either by a constant force or at constant rate depending on the equipment. Measurements are taken once the system has reached steady-state operation. One method used is measuring Brookfield viscosity @140° C., units are mPa-s or cPoise, as known in the art. Alternatively, the melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate. If the melt viscosity of a particular polymer is specified, unless otherwise stated, it is the melt viscosity for that polymer alone, in the absence of any of the other components of the electrostatic composition.

A polymer may be described as comprising a certain weight percentage of monomer. This weight percentage is indicative of the repeating units formed from that monomer in the polymer.

If a standard test is mentioned in this disclosure, unless otherwise stated, the version of the test to be referred to is the most recent at the time of filing this patent application.

As used in this disclosure, "electrostatic printing" or "electrophotographic printing" refers to the process that provides an image that is transferred from a photo imaging plate either directly or indirectly via an intermediate transfer member to a print substrate. As such, the image may not be substantially absorbed into the photo imaging substrate on which it is applied. Additionally, "electrophotographic printers" or "electrostatic printers" refer to those printers capable of performing electrophotographic printing or electrostatic printing, as described above. An electrophotographic printing process may involve subjecting the electrophotographic composition to an electric field, e.g. an electric field having a field gradient of 1-400V/μm, or more, in some examples 600-900V/μm, or more.

As used in this disclosure, "substituted" may indicate that a hydrogen atom of a compound or moiety is replaced by another atom such as a carbon atom or a heteroatom, which is part of a group referred to as a substituent. Substituents include, for example, alkyl, alkoxy, aryl, aryloxy, alkenyl, alkenoxy, alkynyl, alkynoxy, thioalkyl, thioalkenyl, thioalkynyl, thioaryl, etc.

As used in this disclosure, "heteroatom" may refer to nitrogen, oxygen, halogens, phosphorus, or sulfur.

As used in this disclosure, "alkyl", or similar expressions such as "alk" in alkaryl, may refer to a branched, unbranched, or cyclic saturated hydrocarbon group, which may, in some examples, contain from 1 to about 50 carbon atoms, or 1 to about 40 carbon atoms, or 1 to about 30 carbon atoms, or 1 to about 10 carbon atoms, or 1 to about 5 carbon atoms, for example.

The term "aryl" may refer to a group containing a single aromatic ring or multiple aromatic rings that are fused together, directly linked, or indirectly linked (such that the different aromatic rings are bound to a common group such as a methylene or ethylene moiety). Aryl groups described in this disclosure may contain, but are not limited to, from 5 to about 50 carbon atoms, or 5 to about 40 carbon atoms, or 5 to 30 carbon atoms or more, and may be selected from, phenyl and naphthyl.

Unless the context dictates otherwise, the terms "acrylic" and "acrylate" refer to any acrylic or acrylate compound. For example, the term "acrylic" includes acrylic and methacrylic compounds unless the context dictates otherwise. Similarly, the term "acrylate" includes acrylate and methacrylate compounds unless the context dictates otherwise.

As used in this disclosure, the term "about" is used to provide flexibility to a numerical range endpoint by providing that a given value may be a little above or a little below the endpoint to allow for variation in test methods or apparatus. The degree of flexibility of this term can be dictated by the particular variable and would be within the knowledge of those skilled in the art to determine based on experience and the associated description in this disclosure.

As used in this disclosure, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented in this disclosure in a range format. It is to be understood that such a range format is used merely for convenience and brevity and thus should be interpreted flexibly to include not just the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

As used in this disclosure, weight % (wt %) values are to be taken as referring to a weight-for-weight (w/w) percentage of solids in the composition, and not including the weight of any carrier fluid present.

In one aspect, there is provided a liquid electrophotographic electrode ink composition comprising: a thermoplastic polymer comprising a copolymer of an olefin and acrylic acid and/or methacrylic acid; an electroactive material comprising a lithium intercalation material; a charge adjuvant, and a liquid carrier.

The liquid electrophotographic electrode ink composition may be a liquid electrophotographic cathode ink composition or a liquid electrophotographic anode ink composition. For example, a liquid electrophotographic cathode ink composition may comprise a cathodic material as the lithium intercalation material. A liquid electrophotographic anode ink composition may include an anodic material as the lithium intercalation material.

As described in further detail below, the liquid electrophotographic electrode ink composition may comprise 10 to 90 weight % of thermoplastic polymer based on the total weight of solids in the composition. In some examples, the thermoplastic polymer may be present in an amount of 15 to 80 weight %, for instance, 20 to 70 weight % or of the total weight of solids in the composition.

The electroactive material may be present in the liquid electrophotographic ink composition in an amount of 5 to 80 weight %, for example, 10 to 60 weight % or 15 to 50 weight % based on the total weight of solids in the composition.

The liquid electrophotographic electrode ink composition may additionally include a lithium salt. The lithium salt may be present in an amount of 1 to 20 weight %, for example, 5 to 15 weight % of the total weight of solids in the liquid electrophotographic electrode ink composition.

The liquid electrophotographic electrode ink composition may additionally include a solid polymer electrolyte. The solid polymer electrolyte may be polyethylene oxide. Other examples of solid polymer electrolytes include polymers having monomer units derived from at least one of ethylene oxide, propylene oxide, oxymethylene, epichlorohydran, bis-(methoxyethoxyethoxy) phosphazene, oxetane, tetrahydrofuran, 1,3-dioxolane, ethylene imine, ethylene succinate, ethylene sulfide, propylene sulfide, (oxyethylene) methacrylate, (oxyethylene) oxymethylene, (oxyethylene) cyclotrisphosphazene, 2-(4-carboxyhexafluorobutanoyloxy) ethylmethacrylate and derivatives thereof.

The solid polymer electrolyte may be present in an amount of 1 to 40 weight %, for example, 5 to 35 weight % of the total weight of solids in the liquid electrophotographic electrode ink composition.

In another aspect, there is provided a liquid electrophotographic ink composition comprising: a thermoplastic polymer comprising a copolymer of an olefin and acrylic acid and/or methacrylic acid; a solid electrolyte comprising a lithium salt and a solid polymer electrolyte; a charge adjuvant, and a liquid carrier. This liquid electrophotographic ink composition may be a liquid electrophotographic electrolyte ink composition. Where the liquid electrophotographic ink composition is a liquid electrophotographic electrolyte ink composition, the composition may be free of electroactive electrode material.

In another aspect, there is provided a material set comprising a liquid electrophotographic cathode ink composition and a liquid electrophotographic anode ink composition as described herein. The material set may also comprise a liquid electrophotographic electrolyte ink composition as described herein.

In yet another aspect, there is provided a process for assembling an electrochemical cell. The process comprises electrophotographically printing a cathode using a liquid electrophotographic cathode ink composition. The liquid electrophotographic cathode ink composition comprises a copolymer of an olefin and acrylic acid and/or methacrylic acid; a cathodic material comprising a lithium intercalation material; a charge adjuvant, and a liquid carrier. The process also comprises electrophotographically printing an anode using a liquid electrophotographic anode ink composition. The liquid electrophotographic anode ink composition comprises a copolymer of an olefin and acrylic acid and/or methacrylic acid; an anodic material comprising a lithium intercalation material; a charge adjuvant, and a liquid carrier. An electrolyte separator is placed between the printed cathode and anode.

In some examples, the separator is electrophotographically printed over the cathode or the anode using a liquid electrophotographic electrolyte ink composition comprising a thermoplastic polymer comprising a copolymer of an olefin and acrylic acid or methacrylic acid; a solid electrolyte comprising a lithium salt and a solid polymer electrolyte; a charge adjuvant, and a liquid carrier.

An electrophotographic printing process involves creating an image on a photoconductive surface or photo imaging plate (PIP). The image that is formed on the photoconductive surface is a latent electrophotographic image having image and background areas with different potentials. When an electrophotographic ink composition containing charged toner particles is brought into contact with the selectively charged photoconductive surface, the charged toner particles adhere to the image areas of the latent image while the background areas remain clean. The image is then transferred to a print substrate directly, or by first being transferred to an intermediate transfer member (e.g. a blanket) and then to the print substrate.

Electrophotographic printing may be used to print images onto a print substrate. In the present disclosure, liquid electrophotographic printing may be used to produce at least one of the electrodes and/or the separator of a lithium-ion cell. A liquid electrophotographic ink composition is formulated to allow electroactive material to be selectively charged and printed onto a substrate to form an electrode. Similarly, a liquid electrophotographic ink composition is formulated to allow a solid electrolyte comprising a lithium salt and solid polymer electrolyte to be selectively charged and electrophotographically printed to form a separator.

At least one of the liquid electrophotographic ink compositions of the present disclosure may be printed onto a print substrate to form a lithium-ion cell or battery on the substrate. In one example, the liquid electrophotographic electrode ink composition may be printed onto a print substrate to form an electrode (e.g. anode or cathode) on the substrate. A separator may be printed or otherwise placed over the printed electrode. Thereafter, a liquid electrophotographic electrode ink composition may be printed over the separator to provide the counter-electrode. These printing steps may allow a lithium-ion cell or battery to be assembled on the surface of the print substrate. The printed cell or battery may be used as a power source, for example, to generate light, sound or kinetic energy.

The print substrate may be any print substrate. In some examples, at least one of the liquid electrophotographic ink compositions of the present disclosure may be printed onto a packaging substrate to form a lithium-ion cell or battery on the packaging substrate. The resulting packaging may thus include a power source, for example, to generate light, sound or kinetic energy on the packaging. In some examples, the packaging may be provided with e.g. light(s) or speaker(s) that may be powered by the lithium-ion cell printed on the packaging.

Liquid Cathode Ink Composition

As described above, the liquid electrophotographic electrode ink composition may be a liquid electrophotographic cathode ink composition. This composition comprises a thermoplastic polymer comprising a copolymer of an olefin and acrylic acid and/or methacrylic acid; a cathodic material comprising a lithium intercalation material; a charge adjuvant, and a liquid carrier.

Suitable thermoplastic polymers are described in further detail below. However, in some examples the thermoplastic polymer may comprise a copolymer of an olefin (e.g. ethylene) and acrylic acid. The acrylic acid moieties may, at least in certain examples, facilitate Li ion transport to enhance ionic conductivity. The copolymer may comprise 10 to 30 weight % of units derived from acrylic acid, for example, 12 to 25 weight % of 15 to 20 weight %.

The thermoplastic polymer may be present in the liquid electrophotographic cathode ink composition in an amount of 10 to 90 weight % based on the total weight of solids in the composition. In some examples, the thermoplastic polymer may be present in an amount of 15 to 80 weight %, for instance, 20 to 70 weight % or of the total weight of solids in the composition. In some examples, thermoplastic polymer may be present in an amount of 20 to 50 weight % or 25 to 40 weight % based on the total weight of solids in the composition. In some examples, thermoplastic polymer may be present in an amount of 30 to 35 weight % based on the total weight of solids in the composition.

The cathodic material may be any material that is suitable for use as a lithium intercalation material for a cathode of a lithium-ion cell. Examples include transition metal oxides, for example, lithium-containing transition metal oxides. Other examples of cathodic materials include lithium iron phosphate (LFP). Suitable transition metal oxides include lithium cobalt oxide (LCO—$LiCoO_2$), lithium cobalt aluminium oxide (NCA-$LiCoAlO_2$), lithium manganese oxide spinel (LMO—$LiMn_2O_4$), and lithium nickel cobalt manganese oxide (NCM—$LiNi_xCo_yMnO_2$, where $x+y+z=1$, $0 \leq y<1$, $0 \leq z<1$ and $0 \leq x<1$).

Other examples include lithium manganate ($Li_{1+x}Mn_{2-x}O_4$, where $x=0$ to 0.33). $Li_{1+x}Mn_{2-x-y}MyO_4$ (where M contains at least one species of metal selected from the group consisting of Ni, Co, Cr, Cu, Fe, Al and Mg, $x=0$ to 0.33, $y=0$ to 1.0 and $2-x-y>0$), $LiMnO_3$, $LiMn_2O_3$, $LiMnO_2$, $LiMn_{2-x}MxO_2$ (where M contains at least one species of metal selected from the group consisting of Co, Ni, Fe, Cr, Zn and Ta, and $x=0.01$ to 0.1), $Li_2Mn_3MO_3$ (where M contains at least one species of metal selected from the group consisting of Fe, Co, Ni, Cu and Zn), copper-lithium oxide ($Li_2CuO_2$), and vanadium oxide (e.g., $LiV_3O_3$, $LiFe_3O_4$, $V_2O$ or $Cu_2V_2O_7$).

The cathodic material may be present in an amount of 5 to 80 weight %, for example, 10 to 60 weight % or 15 to 50 weight % based on the total weight of solids in the composition. In some examples, the cathodic material may be present in the composition in an amount of 5 to 40 weight %, for example, 8 to 35 weight % or 10 to 30 weight % of the total weight of solids present in the liquid electrophotographic cathode composition. In some examples, the cathodic material may be present in an amount of 12 to 25 weight % or 15 to 20 weight % of the total weight of solids in the composition.

An electrically conductive material that is used in combination with the cathodic material to facilitate charge transfer to and from the cathodic material. Examples of suitable materials include electroconductive carbon materials. For instance, graphite, carbon black, graphene and/or carbon nanotubes (CNT) may be used. The electrically conductive material (e.g. carbon material) may be present in an amount of 1 to 60 or 40 weight %, for example, 5 to 30 weight % or 10 to 20 weight % of the total weight of solids in the composition.

In some examples, the weight ratio of electroconductive material to cathodic material may be 1:5 to 5:1, for instance 1:2 to 2:1.

In some examples, the total weight of electroconductive material and cathodic material in the composition may be 10 to 60 weight %, for example, 15 to 50 weight % or 20 to 40 weight % of the total weight of solids in the liquid electrophotographic cathode composition. In some example, the total weight of electroconductive material and cathodic material in the composition may be 25 to 35 weight %, for instance, about 30 weight % of the total weight of solids in the composition.

The liquid electrophotographic cathode composition may additionally include an electrolyte. The electrolyte may include a lithium salt and/or a solid polymer electrolyte. Suitable lithium salts include lithium hexafluorophosphate, lithium hexafluoroarsenate, lithium nitrate, lithium perchlorate, lithium bis(trifluoromethane) sulfonimide, lithium bis (oxalate) borate, and lithium trifluoromethanesulphonate.

Where used, the lithium salt may be present in an amount of 1 to 20 weight %, for example, 5 to 15 weight % of the total weight of solids in the composition. In some examples, the lithium salt may be present in an amount of 6 to 12 weight %, for instance 8 to 10 weight of the total weight of solids in the electrophotographic cathode composition.

Suitable solid polymer electrolytes include polyethylene oxide (PEO). Other examples of solid polymer electrolytes include polymers having monomer units derived from at least one of ethylene oxide, propylene oxide, oxymethylene, epichlorohydran, bis-(methoxyethoxyethoxy) phosphazene, oxetane, tetrahydrofuran, 1,3-dioxolane, ethylene imine, ethylene succinate, ethylene sulfide, propylene sulfide, (oxyethylene) methacrylate, (oxyethylene) oxymethylene, (oxyethylene) cyclotrisphosphazene, 2-(4-carboxyhexafluorobutanoyloxy) ethylmethacrylate and derivatives thereof.

When present, the solid polymer electrolyte may be present in an amount of 1 to 40 weight %, for example, 5 to 35 weight % of the total weight of solids in the liquid electrophotographic electrode ink composition. The solid polymer electrolyte may be present in an amount of 8 to 30 weight %, for instance, 10 to 25 weight % of the total weight of solids in the electrophotographic cathode composition.

The liquid electrophotographic cathode composition also includes a charge adjuvant as described in further detail below. The charge adjuvant may be present in an amount of 1 to 10 weight %, for instance 2 to 8 weight % or 3 to 5 weight % of the total weight of solids in the liquid electrophotographic cathode composition.

Liquid Anode Ink Composition

As described above, the liquid electrophotographic electrode ink composition may be a liquid electrophotographic anode ink composition. This composition comprises a thermoplastic polymer comprising a copolymer of an olefin and acrylic acid and/or methacrylic acid; a anodic material comprising a lithium intercalation material; a charge adjuvant, and a liquid carrier.

Suitable thermoplastic polymers are described in further detail below. However, in some examples the thermoplastic polymer may comprise a copolymer of an olefin (e.g. ethylene) and acrylic acid. The acrylic acid moieties may, at least in certain examples, facilitate Li ion transport to enhance ionic conductivity. The copolymer may comprise 10 to 30 weight % of units derived from acrylic acid, for example, 12 to 25 weight % of 15 to 20 weight %.

The thermoplastic polymer may be present in the liquid electrophotographic anode ink composition in an amount of 10 to 90 weight % based on the total weight of solids in the composition. In some examples, the thermoplastic polymer may be present in an amount of 15 to 80 weight %, for instance, 20 to 70 weight % or of the total weight of solids in the composition. In some examples, thermoplastic polymer may be present in an amount of 25 to 60 weight % or 30 to 55 weight % based on the total weight of solids in the composition.

The thermoplastic polymer in the liquid electrophotographic anode ink composition may be the same as that used in the liquid electrophotographic cathode ink composition above.

The anodic material may be an electrically conductive material capable of intercalating lithium. In some examples, the electrically conductive material (e.g. carbon material) is the same as the electrically conductive material (e.g. carbon material) employed in some examples of the liquid electrophotographic cathode ink composition described above. However, the amount of electrically conductive material (e.g. carbon material) in the liquid electrophotographic cathode ink composition is less than the amount of electrically conductive material (e.g. carbon material) in the liquid electrophotographic anode ink composition.

Examples of the electrically conductive materials capable of intercalating lithium include electroconductive carbon materials. For instance, graphite, carbon black, graphene and/or carbon nanotubes (CNT) may be used. In some examples, silicon-based materials may be used. The electrically conductive material (e.g. carbon material) may be present in an amount of 1 to 60 weight %, for example, 10 to 50 weight % or 20 to 40 weight % of the total weight of solids in the composition.

The liquid electrophotographic anode composition may additionally include an electrolyte. The electrolyte may include a lithium salt and/or a solid polymer electrolyte. Suitable lithium salts include lithium hexafluorophosphate, lithium hexafluoroarsenate, lithium nitrate, lithium perchlorate, lithium trifluoromethanesulfonimide, lithium bis(oxalate) borate and lithium trifluoromethanesulphonate.

Where used, the lithium salt may be present in an amount 1 to 20 weight % or 5 to 15 weight % of the total weight of solids in the electrophotographic anode composition. In some examples, the lithium salt may be present in an amount of 6 to 12 weight %, for instance 8 to 10 weight of the total weight of solids in the electrophotographic anode composition.

Suitable solid polymer electrolytes include polyethylene oxide (PEO). When present, the solid polymer electrolyte may be present in an amount of 1 to 40 weight %, for example, 5 to 35 weight % of the total weight of solids in the electrophotographic anode composition. The solid polymer electrolyte may be present in an amount of 5 to 35 weight % or 5 to 30 weight %, for instance, 8 to 15 weight % of the total weight of solids in the electrophotographic anode composition.

The liquid electrophotographic anode composition also includes a charge adjuvant as described in further detail below. The charge adjuvant may be present in an amount of 1 to 10 weight %, for instance 2 to 8 weight % or 3 to 5 weight % of the total weight of solids in the liquid electrophotographic anode composition.

Liquid Electrophotographic Ink Composition for Use as Electrolyte

As mentioned above, the present disclosure also provides a liquid electrophotographic ink composition comprising: a thermoplastic polymer comprising a copolymer of an olefin and acrylic acid and/or methacrylic acid; a solid electrolyte comprising a lithium salt and a solid polymer electrolyte; a charge adjuvant, and a liquid carrier. This liquid electrophotographic ink composition may be a liquid electrophotographic electrolyte ink composition. Where the liquid electrophotographic ink composition is a liquid electrophotographic electrolyte ink composition, the composition may be free of electroactive electrode material.

Suitable thermoplastic polymers are described in further detail below. However, in some examples the thermoplastic polymer may comprise a copolymer of an olefin (e.g. ethylene) and acrylic acid. The copolymer may comprise 10 to 30 weight % of units derived from acrylic acid, for example, 12 to 25 weight % of 15 to 20 weight %.

The thermoplastic polymer may be present in the liquid electrophotographic electrolyte ink composition in an amount of 10 to 90 weight % based on the total weight of solids in the composition. In some examples, the thermoplastic polymer may be present in an amount of 15 to 85 weight %, for instance, 20 to 75 weight % or of the total weight of solids in the composition. In some examples, thermoplastic polymer may be present in an amount of 40 to 70 weight % or 50 to 65 weight % based on the total weight of solids in the composition.

The thermoplastic polymer used in the liquid electrophotographic electrolyte ink composition may be the same as that used in either or both of the liquid electrophotographic anode and liquid electrophotographic cathode ink composition.

The liquid electrophotographic electrolyte ink composition may additionally include an electrolyte. The electrolyte may include a lithium salt and/or a solid polymer electrolyte. Suitable lithium salts include lithium hexafluorophosphate, lithium hexafluoroarsenate, lithium nitrate, lithium perchlorate, lithium trifluoromethanesulfonimide, lithium bis(oxalate) borate and lithium trifluoromethanesulphonate.

Where used, the lithium salt may be present in an amount of 1 to 30 weight % of the total weight of solids in the electrophotographic electrolyte ink composition. In some examples, the lithium salt may be present in an amount of 6 to 25 weight %, for instance 10 to 20 weight % of the total weight of solids in the electrophotographic electrolyte ink composition. The amount of lithium salt present in the electrophotographic electrolyte ink composition may be greater than the amount present in the electrophotographic electrode ink composition(s).

Suitable solid polymer electrolytes include polyethylene oxide (PEO). Other examples of solid polymer electrolytes include polymers having monomer units derived from at least one of ethylene oxide, propylene oxide, oxymethylene, epichlorohydran, bis-(methoxyethoxyethoxy) phosphazene, oxetane, tetrahydrofuran, 1,3-dioxolane, ethylene imine, ethylene succinate, ethylene sulfide, propylene sulfide, (oxyethylene) methacrylate, (oxyethylene) oxymethylene, (oxyethylene) cyclotrisphosphazene, 2-(4-carboxyhexafluorobutanoyloxy) ethylmethacrylate and derivatives thereof.

When present, the solid polymer electrolyte may be present in an amount of 1 to 40 weight %, for example, 5 to 35 weight % of the total weight of solids in the electrophotographic electrolyte composition. The solid polymer electrolyte may be present in an amount of 5 to 35 weight % or 5 to 30 weight %, for instance, 8 to 20 weight % of the total weight of solids in the electrophotographic electrolyte composition.

The liquid electrophotographic cathode composition also includes a charge adjuvant as described in further detail below. The charge adjuvant may be present in an amount of 1 to 10 weight %, for instance 2 to 8 weight % or 3 to 5 weight % of the total weight of solids in the liquid electrophotographic electrolyte ink composition.

Alternative Electrolytes

As an alternative to printing the electrolyte using a liquid electrophotographic electrolyte ink composition, it may be possible to assemble the cell using an electrolyte that is placed between the printed cathode and anode by other means. For example, a porous separator may be soaked in a solution of a lithium salt and positioned between the anode and the cathode. As mentioned above, suitable lithium salts include lithium hexafluorophosphate, lithium hexafluoroarsenate, lithium nitrate, lithium perchlorate, lithium trifluoromethanesulfonimide, lithium bis(oxalate) borate and lithium trifluoromethanesulphonate.

Such salts may be dissolved in an organic solvent. Suitable organic solvents for use in the electrolyte are tetrahydrofurane, 2-methyltetrahydrofurane, dimethylcarbonate, diethylcarbonate, ethylmethylcarbonate, methylpropylcarbonate, methylpropylpropionate, ethylpropylpropionate, methyl acetate, dimethoxyethane, 1,3-dioxolane, diglyme (2-methoxyethyl ether), tetraglyme, ethylene carbonate, propylene carbonate, γ-butyrolactone, dioxolane and their mixtures.

In an alternative example, the liquid electrophotographic electrolyte composition may be moulded rather than printed to form the separator.

Polymer

As described above, the electrophotographic composition (i.e. the electrophotographic electrode ink or electrolyte ink composition) includes a thermoplastic polymer comprising a copolymer of an olefin and acrylic acid and/or methacrylic acid. In some examples, the thermoplastic polymer comprises a copolymer of an olefin and acrylic acid. In some examples, the thermoplastic polymer comprises a copolymer of ethylene and acrylic acid. The acrylic acid moieties may, at least in certain examples, facilitate Li ion transport to enhance ionic conductivity. The acrylic acid content of the copolymer may be 5 to 30 weight %, for example, 10 to 25 weight % or 12 to 20 weight % of the total weight of the copolymer. The acrylic acid content of the copolymer may be 15 to 18 weight % of the total weight of the copolymer. An example of a suitable copolymer is an ethylene acrylic acid copolymer comprising 15 weight % of units derived from acrylic acid sold under the trademark Honeywell® AC-5120. The thermoplastic polymer may take the form of a wax and interact with solid components in the electrophotographic electrode ink compositions and/or the electrophotographic electrolyte ink compositions to form toner particles.

The polymer may have a melting point of less than 110 degrees C. or less than 100 degrees C. In one example, the polymer may have a melting point of 50 to up to 110 degrees C., for example, 60 to 100 degrees C. Where a polymer mixture is present, the polymer mixture may have a melting point of less than 110 degrees C. or less than 100 degrees C. In one example, the polymer mixture may have a melting point of 50 to up to 110 degrees C., for example, 60 to 100 degrees C.

In one example, the polymer is a polymer of an olefin (e.g. ethylene) and an acrylic acid (e.g. acrylic acid or methacrylic acid) or acrylate (e.g. acrylate or methacrylate) having a melting point of less than 110 degrees C. or less than 100 degrees C. In one example, the polymer is a polymer of an olefin (e.g. ethylene) and an acrylic acid (e.g. acrylic acid or methacrylic acid) or acrylate (e.g. acrylate or methacrylate) having a melting point of 50 to up to 110 degrees C., for example, 60 to 100 degrees C. or 70 to 95 degrees C. Where the electrophotographic composition comprises a mixture of two or more polymers, at least 50 weight %, at least 60 weight %, at least 70 weight %, at least 80 weight % or at least 90 weight % of the polymer mixture may be formed of polymer(s) having melting points of less than 110 degrees C. or less than 100 degrees C. In one example, at least 50 weight % at least 60 weight %, at least 70 weight %, at least 80 weight % or at least 90 weight % of the polymer mixture may be formed of polymer(s) having melting points of 50 to up to 110 degrees C., for example, 60 to 100 degrees C.

In one example, polymer is a polymer of an olefin (e.g. ethylene) and at least one monomer selected from an acrylic or acrylate monomer, for instance, methacrylic acid, acrylic acid, acrylate and methacrylate. The polymer may comprise at least 80 weight % olefin (e.g. ethylene), for example, 80 to 90 weight % olefin (e.g. ethylene). The polymer may include 10 to 20 weight % of an acrylic or acrylate monomer, for example, at least one of methacrylic acid, acrylic acid, acrylate and methacrylate.

In one example, the polymer is a polymer of an olefin (e.g. ethylene) and methacrylic acid. The polymer may include 80 to 90 weight % ethylene and 10 to 20 weight % methacrylic acid. The polymer may include 85 weight % ethylene and the remainder methacrylic acid. In one example, the polymer is or comprises a polymer sold under the trademark Nucrel® 925.

In one example, the polymer is a polymer of an olefin (e.g. ethylene) and acrylic acid. The polymer may include 80 to 90 weight % ethylene and 10 to 20 weight % acrylic acid. The polymer includes 82 weight % ethylene and the remainder acrylic acid. In one example, the polymer is or comprises a polymer sold under the trademark Nucrel® 2806.

In one example, the polymer resin may include more than one polymer. In an example, the polymer resin may include 2 or 3 polymers. In one example, the polymer comprises a polymer of an olefin (e.g. ethylene) and acrylic acid and a polymer of an olefin (e.g. ethylene) and methacrylic acid. For example, the polymer resin may include a first resin formed of 80 to 90 weight % ethylene and 10 to 20 weight % methacrylic acid, and a second resin formed of 80 to 90 weight % ethylene and 10 to 20 weight % acrylic acid. Where the polymer resin contains a first resin and a second resin, the amount of the first resin may be 60 to 80 weight %, for example, 65 to 75 weight % of the polymer resin mixture. The amount of second resin may be 15 to 25 weight %, for example, 17 to 22 weight % of the polymer resin mixture. The weight ratio the first resin to the second resin may be 2:1 to 5:1, for example, 3:1 to 4:

In one example, the polymer resin includes a first resin formed of 85 weight % ethylene and the remainder methacrylic acid, and a second resin formed of 82 weight % ethylene and the remainder acrylic acid. In one example, the polymer resin includes a mixture of a polymer sold under the trademark Nucrel®925 and a polymer sold under the trademark Nucrel® 2806.

In addition to a copolymer of ethylene and at least one monomer selected from an acrylic or acrylate monomer e.g. as described above, the polymer may also include a terpolymer. The terpolymer may be a terpolymer of a) an olefin (e.g. ethylene), b) an acrylic acid (e.g. acrylic acid or methacrylic acid) or an acrylate (e.g. acrylate or methacrylate) and c) a polar monomer. The olefin (e.g. ethylene) may form 60 to 78 weight % of the terpolymer, for example, 65 to 70 weight % of the terpolymer. The acrylic acid (e.g. acrylic acid or methacrylic acid) or acrylate (e.g. acrylate or methyl acrylate) may form 20 to 35 weight % of the terpolymer, for example, 22 to 30 weight % of the terpolymer. The polar monomer may form the remainder of the terpolymer. Examples of suitable polar monomers include monomers containing amine, amide, ester, ether and/or anhydride functional groups. In one example, the polar monomer contains amide, amine, groups, anhydride groups or both ester and ether groups. In an example, the polar monomer is selected from maleic anhydride or glycidyl methacrylate.

In one example, the terpolymer is a terpolymer of ethylene, methacrylic acid and glycidyl methacrylate. The amount of ethylene may be 60 to 78 weight % of the polymer, for example, 65 to 70 weight % of the terpolymer. The amount of methacrylic acid may range from 20 to 35 weight % of the terpolymer, for example, 22 to 30 weight % of the terpolymer. The remainder of the polymer may be derived from glycidyl methacrylate. In one example, the terpolymer comprises 68 weight % ethylene, 24 weight % methacrylic acid and 8 weight % glycidyl methacrylate. The terpolymer may be one sold under the trademark Lotader® AX8900. The terpolymer may be used in combination with a copolymer of ethylene and methacrylic acid or acrylic acid. For example, such terpolymers (for instance one sold under the trademark Lotader® AX8900) may be employed in combination with polymers sold under the trademark Nucrel® 925.

In one example, the terpolymer is a terpolymer of ethylene, ethyl acrylate and maleic anhydride. The amount of ethylene may be 60 to 80 weight % of the terpolymer, for example, 65 to 70 weight % of the terpolymer. The amount of ethyl acrylate may range from 19 to 35 weight % of the terpolymer, for example, 20 to 30 weight % of the terpolymer. The remainder of the terpolymer may be derived from maleic anhydride. In one example, the amount of maleic anhydride may be 0.1 to 5 weight %, for example, 1 to 3 weight %. In one example, the terpolymer comprises 70 weight % ethylene, 29 weight % ethyl acrylate and 1.3 weight % maleic anhydride. The terpolymer may be used in combination with a copolymer of ethylene and methacrylic acid or acrylic acid. The terpolymer may be sold under the trademark Lotader® 4700. Alternatively, the polymer B may be one or more polymers sold under the trademark Lotader® 5500, Lotader® 4503 and Lotader® 4720. Such terpolymers (for instance one sold under the trademark Lotader® 4700) may be employed in combination with polymers sold under the trademark Nucrel® 925.

Where a terpolymer is employed, the terpolymer may form 1 to 50 weight % of the polymer resin. In some examples, the terpolymer forms 1 to 20 weight %, for instance 5 to 15 weight % of the polymer resin. Where a copolymer of an olefin (e.g.) and an acrylic or acrylate (e.g. methacrylic acid, acrylic acid, methacrylate or acrylate) is employed, the copolymer may form 50 to 100 weight %, for example, 70 to 99 weight %, for instance, 80 or 85 to 95 weight % of the polymer resin.

The polymer resin in the electrophotographic composition may have a melting point of less than 110 degrees C., for example, less than 100 degrees C.

The polymer resin may have (or may contain a polymer having) an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer may have an acidity of 200 mg KOH/g or less, in some examples 190 mg or less, in some examples 180 mg or less, in some examples 130 mg KOH/g or less, in some examples 120 mg KOH/g or less.

Acidity of a polymer, as measured in mg KOH/g can be measured using standard procedures known in the art, for example using the procedure described in ASTM D1386.

The resin may comprise a polymer that has a melt flow rate of less than about 70 g/10 minutes, in some examples about 60 g/10 minutes or less, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The resin may comprise a polymer having a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of, in some examples, about 50 g/10 minutes to about 120 g/10 minutes, in some examples 60 g/10 minutes to about 100 g/10 minutes. The melt flow rate can be measured using standard procedures known in the art, for example as described in ASTM D1238.

Where a terpolymer is present, this may have a melt index of 1 to 20 g/10 min, for instance, 1 to 9 g/10 or 10 g/10 min. In another example, the terpolymer has a melt index of 3 to 8 g/10 min, for instance, 4 to 7 g/10 min.

Where a copolymer of an olefin (e.g.) and an acrylic or acrylate (e.g. methacrylic acid, acrylic acid, methacrylate or acrylate) is employed, the copolymer may have a melt index of 20 to 200 g/10 min, for example, 25 to 70 g/10 min. In one example, the copolymer has a melt index of 25 to 35 g/10 min. This copolymer may be used in combination with another copolymer of an olefin (e.g.) and an acrylic or acrylate (e.g. methacrylic acid, acrylic acid, methacrylate or acrylate) having a melt index of 50 to 70 g/10 min.

The acidic side groups may be in free acid form or may be in the form of an anion and associated with one or more counterions, typically metal counterions, e.g. a metal selected from the alkali metals, such as lithium, sodium and potassium, alkali earth metals, such as magnesium or calcium, and transition metals, such as zinc. The polymer having acidic sides groups can be selected from resins such as co-polymers of ethylene and an ethylenically unsaturated acid of either acrylic acid or methacrylic acid; and ionomers thereof, such as methacrylic acid and ethylene-acrylic or methacrylic acid co-polymers which are at least partially neutralized with metal ions (e.g. Zn, Na, Li) such as ionomers sold under the trademark SURLYN®. The polymer comprising acidic side groups can be a co-polymer of ethylene and an ethylenically unsaturated acid of either acrylic or methacrylic acid, where the ethylenically unsaturated acid of either acrylic or methacrylic acid constitute from 5 wt % to about 25 wt % of the co-polymer, in some examples from 10 wt % to about 20 wt % of the co-polymer.

The resin may comprise two different polymers having acidic side groups. The two polymers having acidic side groups may have different acidities, which may fall within the ranges mentioned above. The resin may comprise a first polymer having acidic side groups that has an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has an acidity of 110 mg KOH/g to 130 mg KOH/g.

The resin may comprise two different polymers having acidic side groups: a first polymer having acidic side groups that has a melt flow rate of about 10 g/10 minutes to about 50 g/10 minutes and an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The ratio of the first polymer having acidic side groups to the second polymer having acidic side groups can be from about 10:1 to about 2:1. The ratio can be from about 6:1 to about 3:1, in some examples about 4:1.

The resin may comprise a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described in this disclosure. The resin may comprise a first polymer having a melt viscosity of 15000 poise or more, in some examples 20000 poise or more, in some examples 50000 poise or more, in some examples 70000 poise or more; and in some examples, the resin may comprise a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The resin may comprise a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

If the resin in the electrophotographic composition comprises a single type of polymer, the polymer (excluding any other components of the electrostatic composition) may have a melt viscosity of 6000 poise or more, in some examples a melt viscosity of 8000 poise or more, in some examples a melt viscosity of 10000 poise or more, in some examples a melt viscosity of 12000 poise or more. If the resin comprises a plurality of polymers all the polymers of the resin may together form a mixture (excluding any other components of the electrostatic composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

The resin can constitute about 5 to up to 100 weight %, in some examples about 50 to 99%, by weight of the solids of the liquid electrophotographic composition. The resin can constitute about 60 to 95%, in some examples about 70 to 95%, by weight of the solids of the liquid electrophotographic composition.

For the avoidance of doubt, the polymer or polymer mixture used in the electrophotographic electrode ink composition may be the same or different to the polymer or polymer mixture used in the electrophotographic electrolyte ink composition. It may be possible to use the same or different polymer in the electrophotographic cathode ink composition, electrophotographic anode ink composition and/or electrophotographic electrolyte ink composition.

Charge Adjuvant

As mentioned above, the electrophotographic composition can include a charge adjuvant. A charge adjuvant may be present with a charge director, and may be different to the charge director, and act to increase and/or stabilise the charge on particles, e.g. resin-containing particles, of an electrostatic composition. The charge adjuvant can include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid. Ba salts of stearic acid, Co salts of stearic acid, Pb salts of stearic acid, Zn salts of stearic acid, Al salts of stearic acid, Cu salts of stearic acid, Fe salts of stearic acid, metal carboxylates (e.g. Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates AB diblock co-polymers of 2-ethylhexyl methacrylate-co-methacrylic acid calcium, and ammonium salts, co-polymers of an alkyl acrylamidoglycolate alkyl ether (e.g. methyl acrylamidoglycolate methyl ether-co-vinyl acetate), and hydroxy bis(3,5-di-tert-butyl salicylic) aluminate monohydrate. In some examples, the charge adjuvant is aluminium di and/or tristearate and/or aluminium di and/or tripalmitate.

The charge adjuvant can constitute about 0.1 to 5% by weight of the solids of the liquid electrophotographic composition. The charge adjuvant can constitute about 0.5 to 4% by weight of the solids of the liquid electrophotographic composition. The charge adjuvant can constitute about 1 to 3% by weight of the solids of the liquid electrophotographic composition.

Charge Director

As an optional component, a charge director may be added to the electrophotographic composition. In some examples, the charge director comprises nanoparticles of a simple salt and a salt of the general formula $MA_n$, wherein M is a barium, n is 2, and A is an ion of the general formula $[R_1—O—C(O)CH_2CH(SO_3^-)C(O)—O—R_2]$, where each of $R_1$ and $R_2$ is an alkyl group e.g. as discussed above.

The sulfosuccinate salt of the general formula $MA_n$ is an example of a micelle forming salt. The charge director may be substantially free or free of an acid of the general formula HA, where A is as described above. The charge director may comprise micelles of said sulfosuccinate salt enclosing at least some of the nanoparticles. The charge director may comprise at least some nanoparticles having a size of 10 nm or less, in some examples 2 nm or more (e.g. 4-6 nm).

The simple salt may comprise a cation selected from Mg, Ca, Ba, $NH_4$, tert-butyl ammonium, $Li^+$, and $Al^{+3}$, or from any sub-group thereof. In one example, the simple salt is an inorganic salt, for instance, a barium salt. The simple salt may comprise an anion selected from $SO_4^{2-}$, $PO^{3-}$, $NO_3^-$, $HPO_4^{2-}$, $CO_3^{2-}$, acetate, trifluoroacetate (TFA), Cl, Bf, $F^-$, $ClO_4^-$, and $TiO_3^{4-}$, or from any sub-group thereof. In some examples, the simple salt comprises a hydrogen phosphate anion.

The simple salt may be selected from $CaCO_3$, $Ba_2TiO_3$, $Al_2(SO_4)_3$, $Al(NO_3)_3$, $Ca_3(PO_4)_2$, $BaSO_4$, $BaHPO_4$, $Ba_2(PO_4)_3$, $CaSO_4$, $(NH_4)_2CO_3$. $(NH_4)_2SO_4$, $NH_4OAc$, Tert-butyl ammonium bromide, $NH_4NO_3$, LiTFA, $Al_2(SO_4)_3$, $LiClO_4$ and $LiBF_4$, or any sub-group thereof. In one example, the simple salt may be $BaHPO_4$.

In the formula $[R_1—O—C(O)CH_2CH(SO_3^-)C(O)—R_2]$, in some examples, each of $R_1$ and $R_2$ is an aliphatic alkyl group. In some examples, each of $R_1$ and $R_2$ independently is a $C_{6-25}$ alkyl. In some examples, said aliphatic alkyl group is linear. In some examples, said aliphatic alkyl group is branched. In some examples, said aliphatic alkyl group includes a linear chain of more than 6 carbon atoms. In some examples, $R_1$ and $R_2$ are the same. In some examples, at least one of $R_1$ and $R_2$ is $C_{13}H_{27}$.

In an electrophotographic composition, the charge director can constitute about 0.001% to 20%, in some examples 0.01 to 20% by weight, in some examples 0.01 to 10% by weight, in some examples 0.01 to 1% by weight of the solids of the electrostatic composition. The charge director can constitute about 0.001 to 0.15% by weight of the solids of the liquid electrophotographic composition, in some examples 0.001 to 0.15%, in some examples 0.001 to 0.02% by weight of the solids of the liquid electrophotographic composition. In some examples, the charge director imparts a negative charge on the electrostatic composition. The particle conductivity may range from 50 to 500 pmho/cm, in some examples from 200-350 pmho/cm.

Carrier Liquid

The electrophotographic composition may be printed in liquid form. Generally, the carrier liquid for the liquid electrophotographic composition can act as a dispersing medium for the other components in the electrostatic composition. For example, the carrier liquid can comprise or be a hydrocarbon, silicone oil, vegetable oil, etc. The carrier liquid can include, but is not limited to, an insulating, non-polar, non-aqueous liquid that can be used as a medium for toner particles. The carrier liquid can include compounds that have a resistivity in excess of about $10^9$ ohm-cm. The carrier liquid may have a dielectric constant below about 5, in some examples below about 3. The carrier liquid can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof. Examples of the carrier liquids include, but are not limited to, aliphatic hydrocarbons, isoparaffinic compounds, paraffinic compounds, dearomatized hydrocarbon compounds, and the like. In some examples, the carrier liquid is an isoparaffinic liquid. In particular, the carrier liquids can include, but are not limited to liquids sold under the trademarks, Isopar-G™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™).

Before printing, the carrier liquid can constitute about 20% to 99.5% by weight of the electrostatic composition, in some examples 50% to 99.5% by weight of the electrostatic composition. Before printing, the carrier liquid may constitute about 40 to 90% by weight of the electrostatic composition. Before printing, the carrier liquid may constitute about 60% to 80% by weight of the electrostatic composition. Before printing, the carrier liquid may constitute about 90% to 99.5% by weight of the electrostatic composition, in some examples 95% to 99% by weight of the electrostatic composition.

The composition when printed on the print substrate, may be substantially free from carrier liquid. In an electrostatic printing process and/or afterwards, the carrier liquid may be removed, e.g. by an electrophoresis processes during printing and/or evaporation, such that substantially just solids are transferred to the print substrate. Substantially free from carrier liquid may indicate that the ink printed on the print substrate contains less than 5 wt % carrier liquid, in some examples, less than 2 wt % carrier liquid, in some examples less than 1 wt % carrier liquid, in some examples less than 0.5 wt % carrier liquid. In some examples, the ink printed on the print substrate is free from carrier liquid.

Printing Process and Print Substrate

In some examples, the electrophotographic compositions as described in this disclosure is printed onto a substrate using a liquid electrophotographic printer.

In the liquid electrophotographic printer, an image is first created on a photoconductive surface or photo imaging plate (PIP). The image that is formed on the photoconductive surface is a latent electrostatic image having image and background areas with different potentials. When an electrophotographic composition containing charged toner particles is brought into contact with the selectively charged photoconductive surface, the charged toner particles adhere to the image areas of the latent image while the background areas remain clean. The image is then transferred to a print substrate either directly or by first being transferred to an intermediate transfer member (e.g. a soft swelling blanket) and then to the print substrate. The intermediate transfer member, if present, may be a rotating flexible member, which may be heated, e.g. to a temperature of from 80 to 105 degrees C.

In the case of the liquid electrophotographic electrode ink compositions of the present disclosure, the toner particles include electroactive material. The electroactive material may therefore be printed onto the substrate. In the case of the liquid electrophotographic electrolyte composition, the toner particles include lithium salt and solid polymer electrolyte. Thus, the lithium salt and solid polymer electrolyte may also be printed over the substrate.

The print substrate may be any suitable substrate. The substrate may be any suitable substrate capable of having an image printed thereon. The substrate may include a material selected from an organic or inorganic material. The material may include a natural polymeric material, e.g. cellulose. The material may include a synthetic polymeric material, e.g. a polymer formed from alkylene monomers, including, but not limited to, polyethylene and polypropylene, and co-polymers such as styrene-polybutadiene. The polypropylene may, in some examples, be biaxially orientated polypropylene. The material may include a metal, which may be in sheet form. The metal may be selected from or made from, for instance, aluminium (Al), silver (Ag), tin (Sn), copper (Cu), mixtures thereof. In an example, the substrate includes a cellulosic paper. In an example, the cellulosic paper is coated with a polymeric material, e.g. a polymer formed from styrene-butadiene resin. In some examples, the cellulosic paper has an inorganic material bound to its surface (before printing with ink) with a polymeric material, wherein the inorganic material may be selected from, for example, kaolinite or calcium carbonate. The substrate is, in some examples, a cellulosic print substrate such as paper. The cellulosic print substrate is, in some examples, a coated cellulosic print. In some examples, a primer may be coated onto the print substrate, before the electrostatic composition is printed onto the print substrate.

In the present disclosure, a process for assembling an electrochemical cell is provided. The process comprises electrophotographically printing cathode using a liquid electrophotographic cathode ink composition comprising a copolymer of an olefin and acrylic acid or methacrylic acid; a cathodic material comprising a lithium intercalation material; a charge adjuvant, and a liquid carrier. An anode is also printed using a liquid electrophotographic anode ink composition comprising a copolymer of an olefin and acrylic acid or methacrylic acid; an anodic material comprising a lithium intercalation material; a charge adjuvant, and a liquid carrier. A separator may be placed between the printed cathode and anode.

In some examples, a liquid electrophotographic cathode ink composition is first printed over a print substrate to form a cathode. The separator may then be electrophotographically printed over the cathode using a liquid electrophotographic ink composition comprising a thermoplastic polymer comprising a copolymer of an olefin and acrylic acid or methacrylic acid; a solid electrolyte comprising a lithium salt and a solid polymer electrolyte; a charge adjuvant, and a liquid carrier. An anode may then be printed over the separator using a liquid electrophotographic anode composition.

Alternatively, the anode may be printed onto the substrate first, followed by the separator and then the cathode.

Various examples will now be described.

Example

Materials:
A-C 5120 (supplied by Honeywell®) as thermoplastic resin component
Lithium trifluoromethanesulfonate (lithium salt)
Lithium Manganese Oxide—LiMnO2 (LMO) as electroactive cathode material
Multi-walled carbon nanotubes—(MWCNT) as electroconductive carbon material
Polyethylene oxide—PEO as solid polymer electrolyte Paste Preparation:
In this method, resin A-C 5120 at 50-57% NVS was inserted in Ross tool and was melted under 50 rpm mixing at 130° C. during 60 minutes. After 60 minutes the mixing velocity was raised to 70 rpm to enhance melting and to produce a paste. This phase was continued for 90 minutes.

Then, the paste was cooled to 25° C. under constant mixing at 50 rpm. The cooling took place over 3-4 hours.

Ink Preparation

Liquid Electrophotographic Anode Ink Composition:

The paste produced above (~55% non-volatile solids (NVS) in iso-paraffin (Isopar®-L (Sol-L)), Lithium Manganese Oxide, MWCNT, Lithium salt, PEO and charging adjuvant were loaded into an Attritor containing metal grinding balls in the amounts shown in Table 1 below. The grinding process was performed at ~43° C. (mixing speed of 250 rpm) for 5 hrs). After reaching the particle size (below 8 micron), the ink was diluted with iso-paraffin (Isopar®-L, Sol-L) and mixed for 15 minutes before being discharged to a receiving container. The % NVS of the obtained ink is in the range of 3-10% NVS.

TABLE 1

| MATERIALS: | Wt (%) |
| --- | --- |
| Paste | 50.00 |
| CNT | 30.00 |
| PEO | 8.00 |
| Li salt | 8.00 |
| VCA | 4.00 |
| TOTAL NVS % | 18.00 |

Liquid Electrophotographic Cathode Ink Composition:

The paste produced above (~55% non-volatile solids (NVS) in iso-paraffin (Isopar®-L (Sol-L)), MWCNT, Lithium salt, PEO and charging adjuvant were loaded into an Attritor containing metal grinding balls in the amounts shown in Table 2 below. The grinding process was performed at ~43° C. (mixing speed of 250 rpm) for 5 hrs). After reaching the particle size (below 8 micron), the ink was diluted with iso-paraffin (Isopar®-L, Sol-L) and mixed for 15 minutes before being discharged to a receiving container. The % NVS of the obtained ink is in the range of 3-10% NVS.

TABLE 2

| MATERIALS | Wt (%) |
| --- | --- |
| Paste | 31.00 |
| LMO | 18.00 |
| PEO | 25.00 |
| Li salt | 10.00 |
| CNT | 12.00 |
| VCA | 4.00 |
| TOTAL % NVS | 18.00 |

Liquid Electrophotographic Electrolyte Ink Composition:

The paste produced above (~55% non-volatile solids (NVS) in iso-paraffin (Isopar®-L (Sol-L)), Lithium salt, PEO and charging adjuvant were loaded into an Attritor containing Ceramic grinding balls (according table 3). The grinding process was performed at ~43° C. (mixing speed of 250 rpm) for 5 hrs). After reaching the particle size (below 1 micron), the ink was diluted with iso-paraffin (Isopar®-L, Sol-L) and mixed for 15 minutes before being discharged to a receiving container. The % NVS of the obtained ink is in the range of 3-10% NVS.

TABLE 3

| MATERIALS: | (%) |
| --- | --- |
| Paste | 64.00 |
| PEO | 16.00 |
| Li salt | 16.00 |
| VCA | 4.00 |
| TOTAL % NVS | 18.00 |

Working Dispersion Preparation:

Before the inks above were printed, they were diluted to form working dispersions. To do this, 3.5 KG of ink 2% NVS were prepared by diluting the inks with iso-paraffin (Isopar®-L, Sol-L). A charge director (NCD) was added till low field of 70 pmho was reached and the dispersion was mixed in a shaker (200 rpm) for 24 h to reach sufficient charging, homogenization and stabilisation.

Cell Assembly and Testing—1

A working dispersion formed using the liquid electrophotographic cathode composition was printed onto a print substrate formed of aluminium foil. A working dispersion formed using the liquid electrophotographic anode composition was printed onto a print substrate formed of aluminium foil. The printed cathode and anode were placed in a beaker containing an electrolyte solution of lithium trifluoromethanesulfonate in propylene carbonate.

It was possible to charge the cell to a voltage of 2.4 to 3.2 volts (as measured using a Fluke® voltage tester), and the cell was used to power an LED light connected via an external circuit. This example shows that a working cell components can be produced by electrophotographic printing.

Cell Assembly and Testing—2

A working dispersion formed using the liquid electrophotographic cathode composition was printed onto a print substrate formed of aluminium foil. A working dispersion formed using the liquid electrophotographic anode composition was printed onto a print substrate formed of aluminium foil. A separator formed using the liquid electrophotographic electrolyte composition described above was used to separate the printed anode and the printed cathode.

The cell was charged to a voltage of 0.4 to 1.3 volts (as measured using a Fluke® voltage tester), demonstrating that a working cell can be produced using the liquid electrophotographic compositions above.

The invention claimed is:

1. A liquid electrophotographic electrode ink composition comprising:
    a thermoplastic polymer comprising a copolymer of an olefin and acrylic acid, or a copolymer of an olefin and methacrylic acid; or a copolymer of an olefin and acrylic acid and methacrylic acid;
    an electroactive material comprising a lithium intercalation material;
    a solid electrolyte comprising a lithium salt and a solid polymer electrolyte;
    a charge adjuvant; and
    a non-polar liquid carrier.

2. A composition as claimed in claim 1, which comprises at least 15 weight % of the electroactive material based on the on the total weight of solids in the composition.

3. A composition as claimed in claim 1, wherein the thermoplastic polymer is included in an amount from 25 wt % to 70 wt % of the total weight of solids in the composition.

4. A composition as claimed in claim 1, wherein the charge adjuvant comprises barium petronate, calcium petronate, aluminum distearate, aluminum tristearate, aluminum dipalmitate, or aluminum tripalmitate.

5. A composition as claimed in claim 1, wherein the lithium intercalation material is an anodic material.

6. A composition as claimed in claim 5, wherein the anodic material comprises an electrically conductive carbon material.

7. A composition as claimed in claim 1, further comprising a charge director.

8. A composition as claimed in claim 7, wherein the charge director comprises nanoparticles of a simple salt and a salt of the formula $MA_n$, wherein M is a barium, n is 2, and A is an ion of the general formula $[R_1-O-C(O)CH_2CH(SO_3^-)C(O)-O-R_2]$, where $R_1$ and $R_2$ are alkyl groups.

9. A composition as claimed in claim 8, wherein the simple salt comprises a cation selected from the group consisting of Mg, Ca, Ba, $NH_4$, tert-butyl ammonium, $Li^+$, and $Al^{+3}$, and wherein the simple salt further comprises an anion selected from the group consisting of $SO_4^{2-}$, $PO_3^-$, $NO_3^-$, $HPO_4^{2-}$, $CO_3^{2-}$, acetate, trifluoroacetate, $Cl^-$, $BF_4^-$, $ClO_4^-$, and $TiO_3^{4-}$.

10. A composition as claimed in claim 1, wherein the lithium intercalation material is a cathodic material.

11. A composition as claimed in claim 10, wherein the cathodic material comprises transition metal oxide selected from at least one of lithium cobalt oxide, lithium cobalt aluminium oxide, lithium manganese oxide spinel, and lithium nickel cobalt manganese oxide.

12. A composition as claimed in claim 10, which further comprises an electrically, conductive material.

13. A composition as claimed in claim 12, wherein the electrically condo material comprises an electrically conductive carbon material.

14. A liquid electrophotographic ink composition comprising:
   a thermoplastic polymer comprising a copolymer of an olefin and acrylic acid, or a copolymer of an olefin and methacrylic acid, or a copolymer of an olefin and acrylic acid and methacrylic acid;
   a solid electrolyte comprising a lithium salt and a solid polymer electrolyte;
   a charge adjuvant; and
   a non-polar liquid carrier.

15. A material set comprising a liquid electrophotographic electrode ink composition as claimed in claim 10, and a liquid electrophotographic electrode ink composition as claimed in claim 5.

16. A material set as claimed in claim 15, which additionally comprises a liquid electrophotographic ink composition as claimed in claim 14.

17. A process for asset Ming an electrochemical cell, said process comprising
   electrophotographically printing cathode using a liquid electrophotographic cathode ink composition comprising a first copolymer of an olefin and acrylic acid or a first copolymer of an olefin and methacrylic acid; a cathodic material comprising a lithium intercalation material; a first charge adjuvant, and a first non-polar liquid carrier;
   electrophotographically printing an anode using a liquid electrophotographic anode ink composition comprising a second copolymer of an olefin and acrylic acid or a second copolymer of an olefin and methacrylic acid; an anodic material comprising a lithium intercalation material; a second charge adjuvant, and a second non-polar liquid carrier; and
   placing an electrolyte separator between the printed cathode and anode.

18. A process as claimed in claim 17, wherein the separator is electrophotographically printed over the cathode or the anode using a liquid electrophotographic ink composition comprising a thermoplastic polymer comprising a third copolymer of an olefin and acrylic acid or a third copolymer of an olefin and methacrylic acid; a solid electrolyte comprising a lithium salt and a solid polymer electrolyte; a third charge adjuvant, and a third non-polar liquid carrier.

* * * * *